United States Patent [19]

Watakabe

[11] Patent Number: 5,020,312
[45] Date of Patent: Jun. 4, 1991

[54] TIRE STEEL CORDS AND METHOD OF MANUFACTURING THEREOF

[75] Inventor: Hidenori Watakabe, Yamaguchi, Japan

[73] Assignee: Kokoku Steel Wire Ltd., Tokyo, Japan

[21] Appl. No.: 428,225

[22] Filed: Oct. 26, 1989

[30] Foreign Application Priority Data

May 23, 1989 [JP] Japan ................................ 1-130674

[51] Int. Cl.⁵ .......................... D07B 1/06; D02G 3/48
[52] U.S. Cl. ........................................ 57/200; 57/311; 57/902
[58] Field of Search ................. 57/200, 206, 258, 311, 57/902

[56] References Cited

U.S. PATENT DOCUMENTS

| 916,048 | 3/1909 | Smith | 57/200 |
|---|---|---|---|
| 1,615,790 | 1/1927 | Forbes et al. | 57/200 X |
| 4,258,543 | 3/1981 | Canevari et al. | 57/902 X |
| 4,333,306 | 6/1982 | Yamashita et al. | 57/206 |
| 4,385,486 | 5/1983 | Iwata et al. | 57/311 X |
| 4,715,419 | 12/1987 | Kawasaki | 57/902 X |
| 4,718,470 | 1/1988 | Kusakabe et al. | 57/902 X |
| 4,738,096 | 4/1988 | Hatakeyama et al. | 57/206 |
| 4,790,129 | 12/1988 | Hutchins | 57/206 X |
| 4,938,015 | 7/1990 | Kinoshita | 57/200 |

FOREIGN PATENT DOCUMENTS 62-282293 12/1987 Japan .

*Primary Examiner*—Joseph J. Hail, III
*Attorney, Agent, or Firm*—Klauber & Jackson

[57] ABSTRACT

A tire steel cord formed of more than three strands twisted together, at least one of the strands being marked so as to formed therein with zig-zagging marked parts which form gaps between strands, rubber accordingly immersing the steel cord into its center part through the thus formed gaps so as to fill in a cavity in the center part of the steel cord.

1 Claim, 1 Drawing Sheet

TIRE STEEL CORDS AND METHOD OF MANUFACTURING THEREOF

BACKGROUND OF THE INVENTION

The present invention relates to tire steel cords adapted to be embedded in a belt section of a tire, and also relates to a method of manufacturing thereof.

DESCRIPTION OF THE PRIOR ART

A conventional open-twisted steel cord is formed of strands which are twisted together with gaps being formed between all or a part of the strands. Then the steel cord is impregnated with rubber which enters through the gaps and completely fills in a cavity in the center part of the steel cord in order to prevent occurrence of the problem of rust that is caused by moisture having entered into a cavity in the center part of a steel cord and that has been inherent to non-open twisted steel cords. That is, the occurrence of rust is eliminated by the rubber filled in the cavity and preventing moisture from entering into the cavity.

However, it has been found that the following problem is inherent even to the above-mentioned open-twisted steel cord, which cannot be imagined in the nonopen-twisted steel cord:

In the open-steel cord, gaps which allow rubber to enter therethrough into the center cavity of the cord are required between the strands, and accordingly, large marking is required throughout the entire length of the steel cord in order to form such gaps, causing non-uniform twist-in lengths of the strands. As a result, the strands possibly shift thereamong, and twisting is likely unstable in the longitudinal direction of the cord, causing large concavities and convexities in a cut cross-sectioned surface of the steel cord, and an excessive elongation under a lower load, resulting in difficulty in working during embedding cords in the belt section of a tire.

Further, upon manufacturing, strands are twisted loosely in order to form structure parts, which inevitably causes unstable twisting. That is, there has been such a problem in manufacture that the strands are unable to be twisted in tight.

SUMMARY OF THE INVENTION

The present invention is devised in view of the above-mentioned problems, and therefore, an object of the present invention is to provide a tire steel cord and a method of manufacturing a tire steel cord which has stable twist with satisfactory immersion of rubber and less elongation under a low load.

To the end, according to the present invention, there is provided a steel cord having more than three strands twisted together, characterized in that at least one of the strands is formed with substantially zig-zagging marked parts along the longitudinal direction.

It is preferable to form 0.05 mm or greater of gaps among the strands due to the provision of the marked parts.

Further, it is preferable to have pitches of 2 mm or more of the marked parts, which is not less than the value twice as large as the pitches of twisting of the strands although the relationship between the pitches of the marked parts and the pitches of twisting of the strands may be taken arbitrarily. In the case in which the pitches are less than 2 mm; it is difficult to maintain the gaps between the strands 0.05 mm or more, while in the case in which the pitches exceed the value twice as large as the pitches of twisting of the strands, spaces in parts through which rubber enters exceed the pitches of twisting of the strands.

Further, in the case of two wires or more each having marked parts, the marked parts among the strands may not only be aligned with each other in the longitudinal direction so that they are adjacent to each other in the circumferential direction, but also be shifted from each other in the longitudinal direction so that they are not adjacent to each other.

Further, according to the present invention, there is provided a method of producing the above-mentioned steel cord, characterized by the steps of: passing one or more of strands which are three or more, between meshed tooth surfaces of a pair of gear-like marking elements so as to mark the strands in a zig-zagging shape, and thereafter, passing the strands into a twisting machine so as to twist the strands. The pitches of teeth of the marking elements and the configuration of the tooth surfaces thereof can be suitably selected in accordance with desired pitches and shape of the marked parts of the strands to be twisted. For example, in the case in which two or more strands are marked, pitches and shapes of the marked parts are suitably selected so as to be identical with each other or to be different from each other.

Thus, gaps are formed between the marked parts and unmarked parts or between the marked parts, which are adjacent to each other while the strands make close contact with each other with no gap in the remaining parts of the strands.

Accordingly, more than one gap between the marked part is formed in the circumferential direction, and they are present at the pitches of the marked parts in the longitudinal direction, thereby it is possible to ensure entrance of rubber along the longitudinal direction.

Further, the strands can be twisted together in tight so as to make close contact with each other so as to be held in a stable twisted condition.

The present invention will be detailed in an embodiment form with reference to the accompanying drawings in which:

DESCRIPTION OF THE PREFERRED EMBODIMENT

Figure 1:
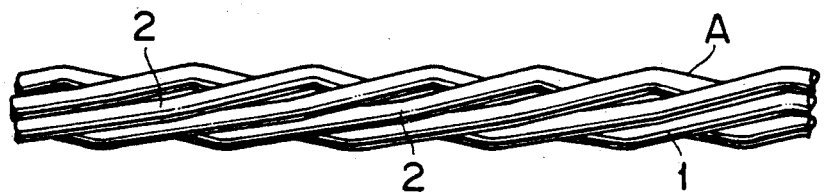
FIG. 1 is a front view illustrating a tire steel cord in one embodiment form of the present invention.
Figure 2:
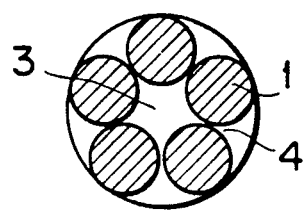
FIG. 2 is a transverse sectional view along the line II—II in FIG. 1.
Figure 3:
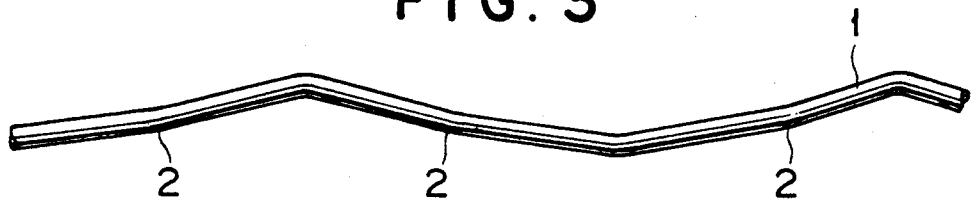
FIG. 3 is a front view illustrating a strand of the cord shown in FIG. 1.

Referring to FIG. 1 in which a tire steel cord A is shown, the tire steel cord A is formed by twisting five strands 1 each of which is marked so as to have substantially zig-zagging marked parts 2 along the longitudinal direction thereof. Gaps 4 communicated with the center part 3 of the cord are formed at positions of the marked parts 2 in the strands 1. The remaining parts of one strand 2 are made in close contact with those of the other strands 2 with no gaps therebetween.

The following table shows the comparison between the tire steel cord according to the present invention and conventional steel cords with data of rubber immersion, stability in twisting and initial elongation.

|  | CONVENTIONAL STEEL CORD | | PRESENT INVENTION (1 × 5 × 0.23 mm), two strands having marked parts |
|---|---|---|---|
|  | NONOPEN CORD (1 × 5 × 0.23 mm) | OPEN CORD (1 × 5 × 0.23 mm) |  |
| RUBBER IMMERSION | No | Satisfactory | Satisfactory |
| STABILITY IN TWISTING | Satisfactory | No | Satisfactory |
| INITIAL ELONGATION | Small | Large | Small |

The table shows that the steel cord according to the present invention is stable and satisfactory in rubber immersion and twisting, and has a small and slight initial elongation, and accordingly is excellent in total.

Figure 4:
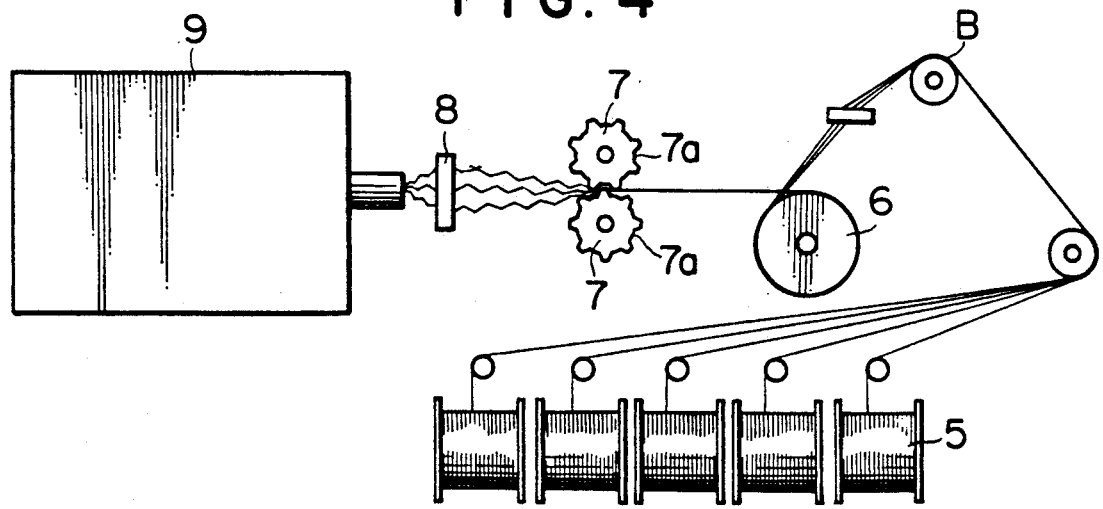
FIG. 4 is a manufacturing machine used for carrying out a method of manufacturing a tire steel cord according to the present invention.

FIG. 4 exemplifies a manufacturing apparatus B developed for carrying out the method of manufacturing steel cords according to the present invention, in which strands 1 drawn for bobbins 5 are led to marking elements 7 by way of a guide roller 6, and are then made to pierce through through-holes in a stationary batten plate 8 after passing between meshed tooth surfaces 7a of the marking elements 7, before being introduced into a twisting machine 9 for twisting the strands into a steel cord.

The marking elements 7 are composed of a pair of gear-like members made of metal, hard synthetic resin or the like, and rotated, being driven in association with the travel of the strands 1 or by drive power from a power source or the like.

Explanation will be made of manufacture of the tire steel cord A shown in FIG. 1 with the use of the above-mentioned manufacturing apparatus B.

The strands 1 having been drawn from the bobbins 5 and guided by the guide roller 6, are marked while they pass between the tooth surfaces 7a of the marking elements 7 so as to form therein substantially zig-zagging marked parts 2, and thereafter, are led to the twisting machine 9 after passing through the through-hole in the batten plate 8, being twisted into a steel cord A having gaps 4 at positions of the marked parts 2.

Further, in the case of such a configuration that strands 1 having marked parts 2 and strands 1 having no marked parts are twisted together, the strands 1 having no marked parts are led directly to the batten plate 8 from the guide roll 6, bypassing the marking elements 7.

Accordingly, the present invesntion has the following advantages:

(1) In a twisted structure in cross-section gaps communicated to the center part of the steel cord are present at the positions of the marked parts of the strands while remaining parts thereof other than the marked parts are twisted in close contact with each other, thereby to give a tightly twisted structure;

(2) Rubber surely and easily immerses the steel cord into the center part thereof, eliminating the problem of rusting and stabilizing the twist of the steel cord, and the elongation under a lower load is small, enhancing the working ability in embedding steel cords in the belt section of a tire;

(3) The steel cords according to the present invention can be mass-produced; and (4) The strands can be tightly twisted and therefore, steel cords having gaps with desired dimensions can be uniformly manufactured.

What we claimed is:

1. A steel tire cord comprising more than three strands of wire, each strand extending in a longitudinal direction thereof, said strands of wire being twisted together, and at least one of said strands extending in a zig-zagging manner along the longitudinal direction thereof so as to form sharp angles therealong, said tire cord having gaps in a center thereof corresponding to positions of the angles.

* * * * *